United States Patent Office 2,765,613
Patented Oct. 9, 1956

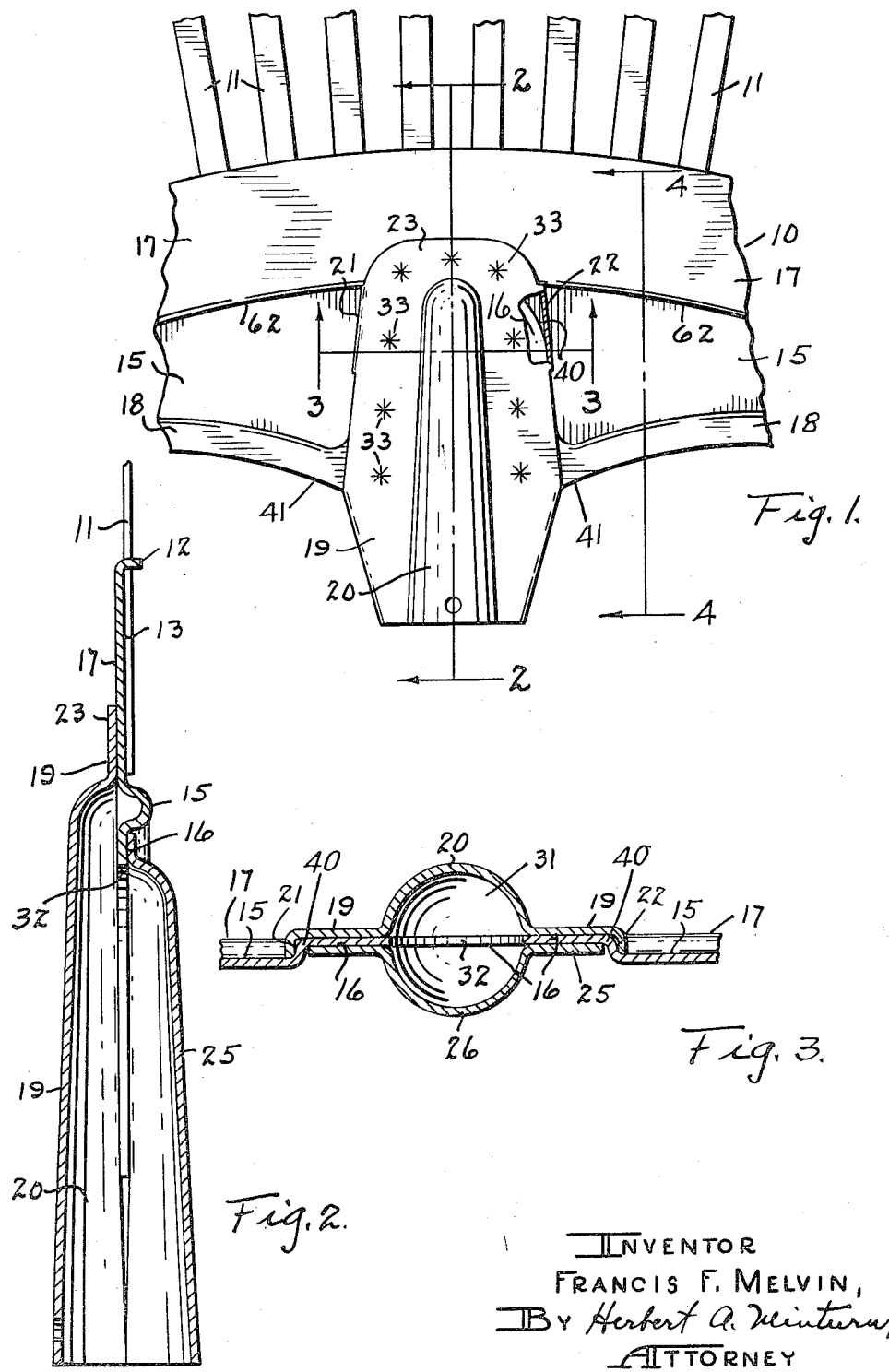

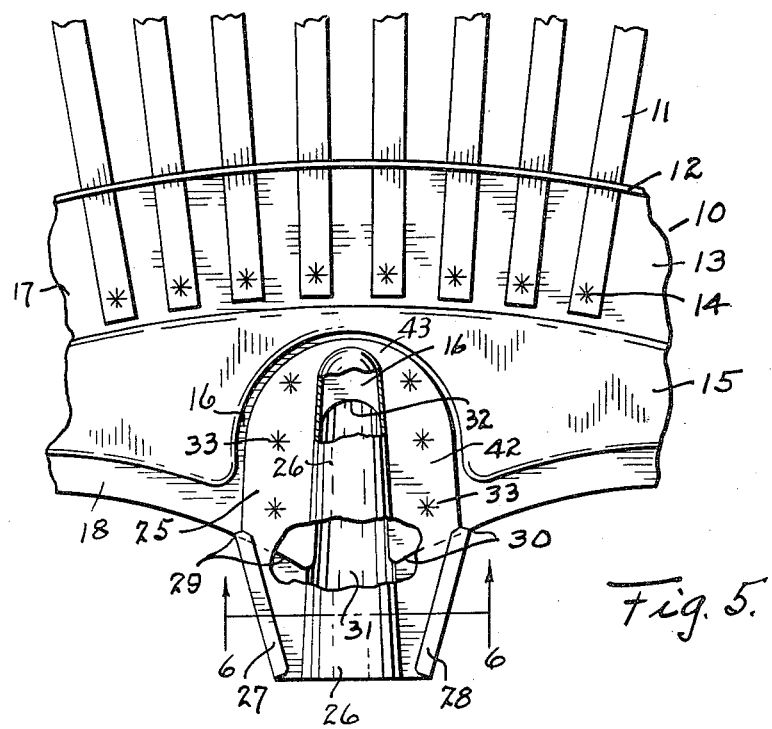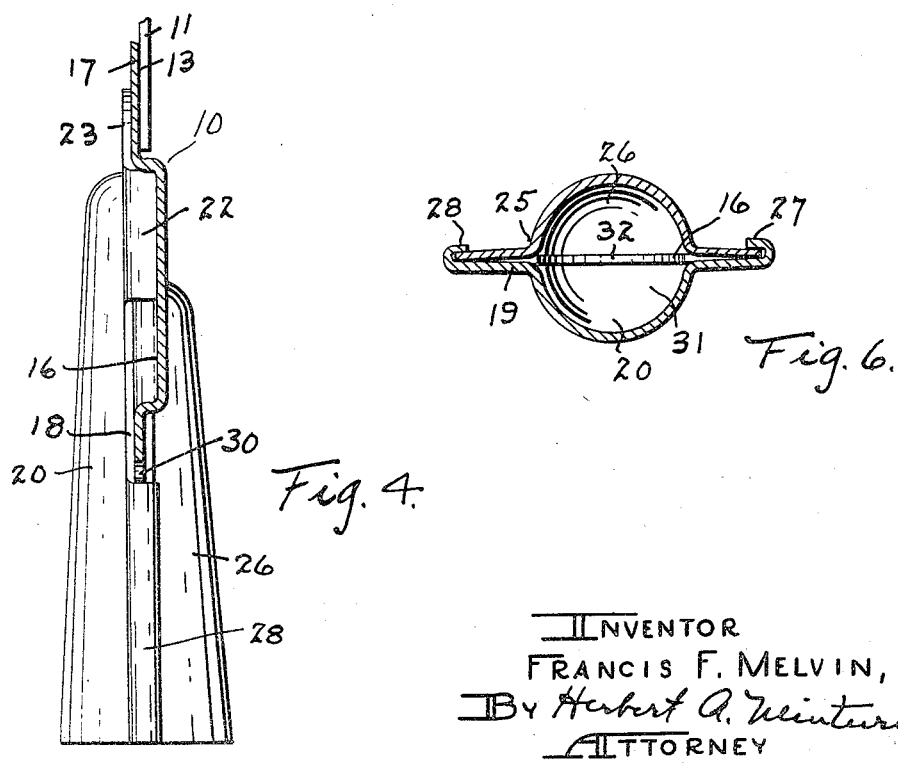

2,765,613

RAKE HANDLE SOCKET ATTACHMENT

Francis F. Melvin, Elwood, Ind.

Application February 16, 1954, Serial No. 410,576

1 Claim. (Cl. 56—400.17)

This invention relates to a device for retaining a handle socket on the head of a rake, such as a broom rake employing flexible tines. The head of the rake is made out of a steel stamping, and it is a primary object of the invention to provide a socket attachment to that head whereby the attaching mechanism will serve not only as a very firm and rigid support for the handle, but also will reinforce the head itself.

A still further important object of the invention is to provide a socket attachment whereby the attachment will not bend at its connection with the head, so that the head and the socket are in fact a rigid unitary construction. The socket itself and also its attaching means are made out of steel parts.

These and many other objects and advantages of the invention will become apparent to those versed in the art in the following description of one particular form of the invention as illustrated in the accompanying drawings, in which Fig. 1 is a fragmentary view of a rake head with the socket attachment embodying the invention in top plan;

Fig. 2 is a view on an enlarged scale in longitudinal section through the device on the line 2—2 in Fig. 1;

Fig. 3 is an enlarged detail intransverse section on the line 3—3 in Fig. 1;

Fig. 4 is an enlarged longitudinal section on the line 4—4 in Fig. 1;

Fig. 5 is a bottom plan view of the structure as illustrated in Fig. 1; and

Fig. 6 is an enlarged section on the line 6—6 in Fig. 5.

The rake head generally designated by the numeral 10 has attached thereto in any suitable manner a plurality of spring teeth or tines 11, the exact method of attachment being immaterial and not a part of the present invention. In the form herein shown, these teeth extend through a downturned flange 12 and back on to a planar area 13 to which the ends of these tines are spot welded such as at the zone 14 in each instance.

The head 10 has a depressed area 15 as viewed from the top side, and the important feature of this depressed area is that from the under side, there is a substantially semi-circular area 16 at a lower level than is the area 15. The depressed area extends transversely of the rake head 10, increasing in width as it comes toward the center, up to this portion 16 which in effect, as viewed from the top side, is at the same level as the remainder of the head on each side of the depression 15. In other words, the head 10 as viewed in Fig. 1 has the portions 17 and 18 at the same level while the area 15 is depressed from that level, and as viewed in Fig. 5 from the under side, the areas 17 and 18 are lower than the area 15. The area 16 is a continuation of the area 18 as a re-entering portion to the part 15. For sake of convenience, the part of the head 10 which is defined within the area 16 will be hereinafter referred to as the section 16.

A plate 19 is formed to have pressed therefrom an elongated, conical section 20 which forms half of a handle receiving ferrule. The plate 19 has downturned legs 21 and 22 along its edges immediately adjacent the forward boundary line 62 of the depressed area 15, these legs 21 and 22 coming up against the side portion 40 of the section 16. It will be noted that the legs 21 and 22 are straight, therefore bind against the sides of the section 16 only at substantially tangential contacts therewith, and the plate 19 is sufficiently long to have a forward end 23 lap on to the section 17 of thehead 10, Fig. 1. Also, the plate 19 is in contact with the area 18 at the extreme rear portion 41 of the head 10.

An under plate 25 is formed to have a forward end portion 42 fitting up into the head 10 within the area 16, extending across the area 18, by a rounded end portion 43, and centrally of the plate 25 there is formed the lower half section of a conical socket 26. The upper section of plate 19 has wings 27 and 28 turned downwardly therefrom and around the edges of the plate 25 to be bent thereunder as indicated in Fig. 5 so that the two plates 19 and 25 are gripped one against the other with the area section 18 extending between those plates up to the wings, that is to the forward ends of those wings designated by the numerals 29 and 30, Fig. 5. As indicated, Fig. 4, the top ferrule section 20 has a greater longitudinal length than does the under section 26, this being done primarily to have the forward end of section 20 extend as far forwardly of the head 10 as possible, at least extending up and over the fore and aft length of the area 15 so that a better reinforcement of that area is had.

Thus the two sections 20 and 26 formed therebetween a socket 31 of a generally elongated conical conformation to receive the handle in the usual and well known manner. The handle would extend between the opposite side or rather terminal ends of the section 18 within the socket proper. That is, the ends of the area 18 within the socket 31 terminate at the inner wall of the socket 31, the area 16 being cut back within that socket 31 to an end designated by the numeral 32, Fig. 2. The cutaway margin is indicated in Fig. 5. The two plates 19 and 25 are preferably welded together through the intervening section 16 and also through the area 17 at such zones as designated by the numeral 33. The downturned legs 21 and 22 serve to prevent twisting of the socket or finished ferrule on the head 10 from side to side thereof, and the wings 27 and 28 prevent the opening up of the ferrule by the spreading apart of the two sections 20 and 26.

Therefore it is to be seen that I have provided a very rigid inter-connection between the handle socket or ferrule and the rake head into one precise form as shown, with a minimum number of parts, all in a very unique manner, and it is obvious that structural changes may be made in that form without departing from the spirit of the invention, so that I do not desire to be limited to that precise form beyond the limitations which may be imposed by the following claim.

I claim:

A rake head handle attachment structure comprising a rake head having front and rear portions at a common level between which portions transversely extends an area section across the head at a lower level, and further having a raised central area section extending longitudinally between said front and rear portions across said lower area section level and at the level of those head front and rear portions; a top half handle receiving ferrule plate lying centrally disposed over said central area section extending therefrom forwardly by an end to lap over said head front portion and rearwardly therefrom by a length back of said head rear portion; a leg downturned from each side of said plate extending to said head lower level along and in contact with the sides of said central area section; an under half handle receiving ferrule plate lying by a forward end portion against the under side of said central area section and extending rearwardly of and under said head rear portion by a length in contact with said upper ferrule plate length; means fixing together said lengths of the upper and lower ferrule plates back of said head rear portion; means fixing both of said ferrule plates one to the other through the intervening central area section; said upper plate being additionally secured by its said lapping end to said head front portion; said central area section terminating by a forward, rounded end short of said head front portion.

References Cited in the file of this patent

UNITED STATES PATENTS

| | | |
|---|---|---|
| 2,252,114 | Brown | Aug. 12, 1941 |
| 2,672,006 | Melvin | Mar. 16, 1954 |
| 2,720,745 | Melvin | Oct. 18, 1955 |